(12) United States Patent
Pauws et al.

(10) Patent No.: US 10,741,218 B2
(45) Date of Patent: Aug. 11, 2020

(54) ELECTRONIC DEVICE AND METHOD FOR REPRODUCING A HUMAN PERCEPTUAL SIGNAL

(75) Inventors: Steffen Clarence Pauws, Eindhoven (NL); Fabio Vignoli, Eindhoven (NL); Gertjan Leendert Wijnalda, Utrecht (NL)

(73) Assignee: Koninklijke Philips N.V., Eindhoven (NL)

( * ) Notice: Subject to any disclaimer, the term of this patent is extended or adjusted under 35 U.S.C. 154(b) by 665 days.

(21) Appl. No.: 11/815,886

(22) PCT Filed: Jan. 30, 2006

(86) PCT No.: PCT/IB2006/050315
§ 371 (c)(1),
(2), (4) Date: Aug. 9, 2007

(87) PCT Pub. No.: WO2006/085236
PCT Pub. Date: Aug. 17, 2006

(65) Prior Publication Data
US 2008/0254946 A1    Oct. 16, 2008

(30) Foreign Application Priority Data
Feb. 14, 2005   (EP) .................................... 05101075

(51) Int. Cl.
*A63B 71/06*   (2006.01)
*G11B 27/10*   (2006.01)

(52) U.S. Cl.
CPC ........ *G11B 27/105* (2013.01); *A63B 71/0686* (2013.01); *A63B 2071/0625* (2013.01); *A63B 2230/06* (2013.01)

(58) Field of Classification Search
CPC .............. G11B 27/105; A63B 71/0686; A63B 2071/0625; A63B 2230/06;
(Continued)

(56) References Cited

U.S. PATENT DOCUMENTS 4,776,323 A   10/1988   Spector
5,137,501 A    4/1992   Mertesdorf
(Continued)

FOREIGN PATENT DOCUMENTS

EP    1126434 A1   8/2001
FR    2827069 A    1/2003
(Continued)

OTHER PUBLICATIONS

Gertjan Wijnalda, et al: A Personalized Music System for Motivation in Sport Performance, IEEE vol. 4, No. 3, Jul. 2005, pp. 26-32, XP002393734.
(Continued)

*Primary Examiner* — Loan B Jimenez
*Assistant Examiner* — Shila Jalalzadeh Abyaneh

(57) ABSTRACT

The method of reproducing a human perceptual signal comprises the steps of selecting (7) a human perceptual signal in dependency of a pace of a person (3), adapting (8) the human perceptual signal in dependency of a physical state of the person (3), and reproducing (9) the human perceptual signal. An adaptation of the human perceptual signal is limited to a certain maximum. The electronic device of the invention comprises electronic circuitry operative to perform the method of the invention. The software of the invention enables a programmable device to perform the method of the invention.

15 Claims, 2 Drawing Sheets

(58) Field of Classification Search
CPC ............ A63B 71/0622; A63B 2230/04; A63B 2230/045; A63B 2230/062; A63B 2220/17; A63B 2220/30
USPC ........................................................ 482/1–9
See application file for complete search history.

(56) References Cited

U.S. PATENT DOCUMENTS

| | | | |
|---|---|---|---|
| 5,314,389 A | | 5/1994 | Dotan |
| 5,976,083 A | * | 11/1999 | Richardson .......... A61B 5/0245 482/8 |
| 6,230,047 B1 | | 5/2001 | McHugh |
| 6,716,139 B1 | | 4/2004 | Hosseinzadeh-Dolkhani et al. |
| 2002/0022551 A1 | * | 2/2002 | Watterson et al. ............... 482/8 |
| 2002/0115937 A1 | | 8/2002 | Song |
| 2005/0209051 A1 | * | 9/2005 | Santomassimo ....... A63B 24/00 482/8 |
| 2006/0030907 A1 | * | 2/2006 | McNew ........................ 607/88 |
| 2006/0107822 A1 | * | 5/2006 | Bowen .................... G10H 1/40 84/612 |

FOREIGN PATENT DOCUMENTS

| | | |
|---|---|---|
| GB | 2121219 A | 8/1983 |
| JP | 06343716 A | 12/1994 |
| JP | 2001299980 A | 10/2001 |
| JP | 2003108154 A | 4/2003 |
| JP | 2004113552 A | 4/2004 |
| JP | 2004240252 A | 8/2004 |
| WO | 03005339 A1 | 1/2003 |
| WO | 2004058059 A2 | 7/2004 |
| WO | 2004072767 A2 | 8/2004 |
| WO | WO 2004072767 A2 * | 8/2004 |
| WO | 2006085237 A1 | 8/2006 |

OTHER PUBLICATIONS

Yokoama K et al: Human Interface for Heart Rate Control During Bicycle Egometer Exercise, Advances in Networked Enterprises, Virtual Organizations, Balanced Automation and Systems Intergration, Sep. 27, 2000, pp. 377-388, XP008039714.

Yoshikazu Itami et al: "Virtual Aerobics System With Accurate Motion Speed Control", IPSJ, Journal, vol. 44, No. 2, Feb. 2003, pp. 478-485.

* cited by examiner

| exercise type | duration | intensity | strictness |
|---|---|---|---|
| warm up | 20 min. | - | loose |
| stretch | 5 min. | - | - |
| run | 20 min. | 50 - 60 % | strict |
| recover | - | 40 % | loose |
| stretch | 5 min. | - | - |
| jog | 3 km | - | - |
| cool down | variable | - | - |

ELECTRONIC DEVICE AND METHOD FOR REPRODUCING A HUMAN PERCEPTUAL SIGNAL

The invention relates to an electronic device for reproducing a human perceptual signal, a music player for example.

The invention further relates to a method of reproducing a human perceptual signal.

The invention also relates to software enabling a programmable device to perform a method of reproducing a human perceptual signal.

An electronic device for reproducing a human perceptual signal is known from WO 2004/072767. WO 2004/072767 describes an audio reproduction device which adapts the tempo of an audio signal such that the tempo of the adapted audio signal lies within a predefined accepted deviation from a selected tempo. A drawback of this audio reproduction device is that it does not invoke an optimal performance from the person, the optimal performance being the performance that benefits the person's health the most.

It is a first object of the invention to provide an electronic device of the kind described in the opening paragraph, which invokes a more beneficial performance from a person.

It is a second object of the invention to provide a method of the kind described in the opening paragraph, which invokes a more beneficial performance from a person.

The first object is according to the invention realized in that the electronic device comprises electronic circuitry operative to select a human perceptual signal in dependency of a pace of a person, adapt the human perceptual signal in dependency of a physical state of the person, an adaptation being limited to a certain maximum, and reproduce the human perceptual signal. Tests have shown that simply synchronizing an audio signal with a target pace or target physical state does not motivate or relax the user to reach that target. To make a person change its pace (and thus its physical state), it is important to select an audio signal that is almost synchronized with the person's pace. Whether the audio signal needs to be adapted depends on whether the person needs to change its pace. Whether the person needs to change its pace depends on whether the physical state target (e.g. heart rate target) is achieved. Achieving and maintaining the physical target is beneficial for the person's health.

The human perceptual signal may comprise audio, video, light and/or tactile feedback, for example. The electronic device may be a stationary or a portable device. The electronic device may be used in health clubs, at home and/or outdoors, for example. The step of selecting a human perceptual signal may comprise selecting a new content item or adapting a human perceptual signal of an already playing content item. Preferably, the new content item is selected based on its tempo when it is a music item. Preferably, the human perceptual signal's tempo is adapted when it is an audio signal. The person's pace may be, for example, rotations per minute while bicycling or steps per minute while running. The person's physical state may be determined by measuring his heart rate, for example. If the physical state matches a target state, the human perceptual signal need not be adapted.

In an embodiment of the electronic device of the invention, the electronic circuitry is operative to adapt the human perceptual signal by increasing its tempo if the physical state of the person does not meet a certain criterion. This embodiment can be used to motivate the person to meets its physical state target, e.g. if the pace of the person is too slow to achieve his heart rate target.

The electronic device may further comprise a user control for pausing a current exercise and the electronic circuitry may be configured not to increase the tempo of the human perceptual signal while the current exercise is paused. This prevents the electronic device from tying to motivate the person while the person really does not want to be motivated. A special human perceptual signal may be selected while the current exercise is paused. If the target of the current exercise includes a target length of the exercise, the elapsed time may also be paused.

The electronic circuitry may be operative to adapt the human perceptual signal by decreasing its tempo if the physical state of the person exceeds a certain criterion. This can be used to relax the person to meet its physical state target, e.g. if his heart rate is too high.

The electronic circuitry may be operative to select a human perceptual signal in dependency of a pace of the person and the electronic circuitry maybe configured not to adapt the human perceptual signal if the physical state of the person meets a certain criterion and does not exceed the certain criterion. This can be used to make the person maintain his current pace if his physical state target is met.

The electronic device may be operative to select a new content item to be reproduced based on a predicted pace and/or predicted physical state of the person in a next plurality of seconds. This avoids having to select new content items too often and to avoid having to make major adaptations to the audio signal too often. The pace and/or physical state may be predicted based on the target pace and/or physical state or based on a history of the person's pace and/or physical state.

The electronic device may further comprise a user control for skipping to a next physical exercise, the next physical exercise being associated with a next criterion. Each exercise may have its own physical state (e.g. heart rate) target. If the person wants to end an exercise prematurely, this user control ensures that the electronic device does not motivate or relax the person incorrectly.

The second object is according to the invention realized in that the method comprises the steps of selecting a human perceptual signal in dependency of a pace of a person, adapting the human perceptual signal in dependency of a physical state of the person, an adaptation being limited to a certain maximum, and reproducing the human perceptual signal.

These and other aspects of the electronic device and method of the invention will be further elucidated and described with reference to the drawings, in which.

Corresponding elements within the drawings are identified by the same reference numeral.

Figures 1, 2:
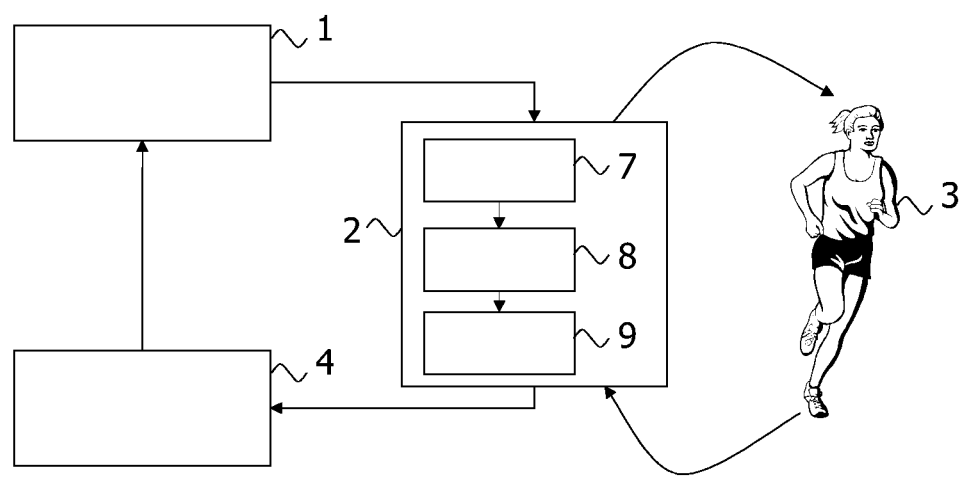
FIG. 1 shows an example of workout scheme that is used in an embodiment of the method of the invention.
FIG. 2 is a flow chart of an embodiment of the method of the invention.

The use of music appeals to physical sport exercising, especially to sports that are individual, repetitive, and endurance. Listening to music, before and during exercising, is deemed to increase work output by dissociation, by motivation, and by improving affective states and to provide improved control and skill learning for motor control. Hence, music can be an excellent guide for keeping up to a physical exertion, especially when this exertion is monotone, repetitive, and boring. Runners with music on their ears are already an everyday appearance on the streets.

Many recreational exercisers and endurance athletes/sportsmen work with personal training programs for their health and sports experience. These training programs basically define the sequence of exercises that needs to be done, and the duration and intensity of each individual exercise. They fit in a complete plan and are adapted over time, either to work towards peak performance, weight control, or injury recovery.

The method of the invention is preferably used in a personalized music system for sport exercising that realizes an integration of sport training programs, music selection, and music playback. It should make sport exercising more enjoyable and should help the user in keeping up with the intended goals as set in the training program. In short, before the work out, the system supports the user in pre-selecting preferred music that suits the physical exertion in the training program. During the work out, songs are selected for playback and properties of the music playback, in particularly, the musical tempo, are adapted either to reflect or to guide current user performance expressed in heart rate and movement frequency. After the work out, performance and playback data are collected for visual inspection, for training program adaptation, and for refining future music selections by learning.

Many individual endurance sport practices require the motivation to persevere, even when these exertions evoke feelings of monotony, boredom, pain, fatigue, and exhaustion without the provision of instant rewards. In the field of Sport and Exercise Psychology, it is postulated that exercisers employ various associative/internal and dissociative/external strategies to cope with the physical demands due to the physical intensity and required endurance of their sports exertions. Under low to moderate physical load, exercisers are able to voluntary divert attention (i.e., 'dissociate') from internal sensations coming from the muscles, joints, cardiovascular and pulmonary systems. Used dissociative strategies are imagery production, positive mood development (e.g., by thinking about the nice things in life), having thoughts about work, career, or social relationships, creating self-efficacy, self-esteem and confidence, or doing problem solving such as mental arithmetic. Apparently, at approximately 70% of maximal heart rate reserve (MHRR), exercisers are forced to start switching their attention from external cues back to internal sensations of physical discomfort. At a level of physical load where feelings of extreme fatigue or exhaustion prevail (e.g., at 90% $VO_2$ MAX), exercisers are not longer able to 'dissociate' themselves from the incoming painful sensations. Instead, exercisers have to directly 'fight' against the pain to persevere their exertion, for which high levels of motivation and exertion tolerance are required.

Besides making physical exertion more enjoyable, music might also help an exerciser to dissociate from exertive feelings or even be a motivator to sustain effort. Studies have shown that up-tempo music can enhance performance, though only in physical tasks of low and moderate levels of exertion (i.e., having sub-maximal effort). Doubling the pace of the music at the apparent critical level of 70% MHRR enables exercisers to postpone their time to fatigue; it seems that the change in musical tempo helps them in prolonging their period of using a 'dissociative' coping strategy. If exercisers are explicitly instructed to keep pace with the music being played, performance will enhance. In particular, endurance enhanced in a stationary constant-pace cycling task when pedaling rate was synchronized with music. Background music that was asynchronous to the pedaling did not reveal the same effect as opposed to the absence of music. In high intensity exertions (e.g., at 90% $VO_2$ MAX), the exertive feelings become too overwhelming and undifferentiated and reach levels of extreme fatigue and exhaustion. As already mentioned, at that level of exertion, exercisers can not longer voluntary divert their attention to external stimuli. Hence, music will not help them in improving to sustain their effort, though music still brings greater enjoyment to the task than no music.

The happy marriage between solo endurance sports and music playback has already resulted in consumer products. A business collaboration between the electronics firm Philips and sportswear manufacturer Nike created a combined device, called MP3Run (PSA260), which acts as a portable music player and a performance/training display and logging system. The player is a 256 MB flash-memory device for playing about four to eight hours MP3 or WMA-encoded music and contains FM radio. Music can be refreshed by down-loading. For the performance logging, it comes with a pedometer that wirelessly transmits (using Bluetooth) speed and distance data to the device for display and on-demand audio feedback. Performance data can be uploaded to a personal computer for inspection. However, music playback or refreshing is not coupled to the performance.

A training program prescribes the sequence of physical exercises that are scheduled in a single training. The definition of an exercise may include (see FIG. 1):

The type of exercise, which refers to an exertion within sports like running, cycling, rowing, aerobics, and fitness;

The exercise duration, which specifies the period of time that the exercise should take, possibly at a prescribed intensity level;

The exercise intensity, which specifies at what level of exertion the exercise should be performed. It is expressed in percentage of maximal heart rate reserve (MHRR), which may specify a desired heart rate zone. For instance, the aerobic heart rate zone for improved endurance and optimal cardiovascular training is at 70-80% of MHRR; The exercise stringency, which tells how strictly or how loosely the exercise should be performed in terms of duration and intensity.

For particular exercise types, parameters are irrelevant or can not be predicted. For instance, the heart rate during a warm up or stretch exercise is less relevant, and presumably at rest. How long it takes to recover from an exertion until the heart rate is at rest is also not known beforehand.

Note that a training program can also consist of a single exercise such as a run of one hour, for those who prefer 'a loose run across the park' instead of committing themselves to training programs. Typically, the training program is part of a complete and personalized coaching plan to achieve a well-defined long term goal such as working towards peak performance at a sports event, extending endurance, building up strength and power, losing weight, getting healthier, staying healthy, or rehabilitating physically. The plans, together with the training programs, are created by sports physiologists, coaches, trainers, consultancy firms for sports and health, or by the people themselves, possible helped by present-day computer technologies.

In the embodiment of the invention that is shown in FIG. 2, helping the user in keeping up with the intended goals as set in the training program by the use of preferred music is done in four usage stages. The four stages are an installation stage (not shown), a preparation stage 1, an exercising stage 2, and a feedback stage 4. The installation stage, the preparation stage 1, and the feedback stage 4 are off-line. In other words, the tasks involved in these stages will be performed at home using a personal computer before or after the physical exertion. In contrast, the exercising stage 2 is on-line, while the user is physically exercising.

Installation Stage

First-time use of the system requires an installation stage (not shown) to personalize the system. In an dialogue, the system requests relevant personal data (e.g., name, gender, age), exercise and physiological data (e.g., weight, fat percentage, resting heart rate, aximal or peak heart rate, stride frequency, stride length), and the level of sports experience (i.e., beginner, intermediate, experienced) to the user. In addition, the definition of exercises can be altered or added, together with the likes and dislikes of music. Multiple users can use the system, though they all have their individual profile. Users can always come back to this installation stage to reset their data.

Preparation Stage 1

The preparation stage 1 is concerned with off-line training program creation and music pre-selection. Ready-made training programs are available for use, adaptation, or can be created from scratch. Subsequently, preferred music is selected from a larger music collection that fits the training program. Music pre-selection before the actual training commences ensures a hassle-free sports and music experience. In addition, it copes with storage limitations on present-day portable flash-based players. Different training exercises have quite different characteristics in motion, pace, intensity, and duration. For instance, a warming-up is different from an interval training exercise, for it does not consider the exercise intensity or user performance. Instead, a warming-up requires full concentration of the exerciser. These different exercise characteristics require different selections of preferred music. Both the music and the training program are downloaded to a portable player to take along. The following requirements were designed into the music pre-selection strategy of the system:

Personal music preferences regarding likes and dislikes of songs, music genres, artists and the like in relation to the exercises in the training program are taken into account.

An amount of music is selected that is proportional to the duration of the individual exercises and of the training program as a whole.

Music is selected on the basis of the intensity of the exercises. In particular, exercise intensities are translated into musical tempo properties.

User performance indicators are used to learn what songs need to be included or excluded in future pre-selection.

To formalize the music pre-selection process, we define a song as a finite vector $s=(v_1, \ldots v_K)$ of K attribute values. These attributes reflect tags of catalogue data or musically intrinsic features such as unique identification, title information, artist name, genre, time duration, music tempo, and time signature. Values for these tags can be easily provided by online services from third parties or music signal processing algorithms. All possible values for each k-th attribute are collected in an attribute domain denoted by $D_k$.

A finite set of m songs $M=(s_1, \ldots s_m)$ represents the music collection of the user. Music pre-selection is achieved by generating a play set that is defined as an (unordered) set of n songs $p=(p_1, \ldots p_K)$ where $p_i \in M$ for $i=1, \ldots, n$. We use $p_{ik}$ to denote the value of the k-th attribute of the i-th song in the play set. For notational convenience, we consider the size of the play set n to be known. In practice, the size of the play set is made variable.

For each individual exercise, a set of constraints C is defined, either by the user or by the system from which a play set can be generated. In addition, constraints are defined that should hold for the training programme as a whole, for instance, to guarantee that different songs are selected for the exercises and that all music fits on the portable player. All play sets are combined into a collection of pre-selected music to be used in the exercising stage. Constraints are restrictions that tell in declarative terms what songs should be in the play set and what songs should not. Constraints can reflect music preferences of the user or restrictions on music attributes that suit the physical exertion in an exercise. A play set is said to satisfy a constraint if it meets the restrictions that are defined by that constraint. Otherwise, it is said to violate the constraint.

If the user dislikes music with particular attributes (e.g., an artist or genre) while doing a particular exercise, she can prevent the selection of this type of music by notifying the system about this fact through a user interface. The system then instantiates an exclude constraint. Formally, the exclude constraint is given by a four-tuple (p, n, k, V), where:

p is a play set,
n is the size of p,
k is an attribute number, $1 \le k \le K$,
V is a set of attribute values, $V \subseteq D_k$,
denoting that it has to hold that $p_{ik} \notin V$, for all $1 \le i \le n$.

If, on the other hand, the user likes music with particular attributes, the system instantiates a counting constraint that restricts and forces the number of occurrences of particular attribute values in the play set. Formally, the counting constraint is given by a six-tuple (p, n, k, V, a, b), where:

p is a play set,
n is the size of p,
k is an attribute number, $1 \le k \le K$,
V is a set of attribute values, $V \subseteq D_k$,
a and b are a lower bound and an upper bound, respectively,
denoting that it has to hold that $a \le |\{1 \le i \le n | p_{ik} \in V\}| \le b$.

If an exercise has a limited duration, a set of songs needs to be selected that has a similar total duration, for which a duration constraint can be used. Formally, the duration constraint is given by a five-tuple (p, n, k, a, b), where:

p is a play set,
n is the size of p,
k is an attribute number, $1 \le k \le K$,
a and b are a lower bound and an upper bound, respectively,
denoting that it has to hold that $$a \le \sum_{i=1}^{n} p_{ik} \le b.$$

By its intensity and stringency, an exercise restricts the play set generation on the range of musical tempi that need to be included. If we assume that movement frequency will be synchronized with the music (or vice versa), only music with a specific range of musical tempi is required, for which a range constraint is available. The precise restrictions on music tempo in relation to the exercises need to be learned for each specific user. Formally, the range constraint is given by a five-tuple (p, n, k, v, w), where:

p is a play set,
n is the size of p,
k is an attribute number, $1 \le k \le K$, v and w are a lower bound and an upper bound, respectively, where v, w∈$D_k$ denoting that it has to hold that $v \leq p_{ik} \leq w$, for $1 \leq i \leq n$. Likewise, songs can be generated for the playset as if the values for the k-th attribute are drawn from a statistical distribution (e.g., a Normal distribution).

Note that constraints that restrict the order of songs are not modelled, as play sets are considered un-ordered collections. 1) Implementation by local search: Satisfying a set of constraints is a NP-hard combinatorial problem. It is thus unlikely that a polynomial algorithm exists that computes a playset that meets any given set of constraints. If constraints are conflicting, there exists even no feasible solution. Therefore, instead of striving for an exact solution, an approximate solution is computed by using local search. In this local search approach, the constraints on each playset are translated into normalized, piece-wisely linear penalty functions. Each penalty function is defined to be zero if the constraint is met, to be larger than zero if the constraint is not met, and to increase with the amount of violation of the constraint. As an example, the penalty function for the duration constraint is defined as $$f(p, n, k, a, b) = \begin{cases} 0, & a \leq \sigma \leq b \\ \frac{a - \sigma}{\delta}, & \sigma < a \\ \frac{\sigma - b}{\delta}, & \sigma > b \end{cases}$$

where $$\sigma = \sum_{i=1}^{n} p_{ik}$$

and $\delta = \max(a - n \cdot \min D_k, n \cdot \max D_k - b)$. The penalty is zero, if the summation of all k-th attribute values (e.g., total duration) is within the range [a, b]. Otherwise, the penalty is a normalized difference between that summation and the closest lower or upper bound.

The total penalty is defined as a weighted convex combination of all penalty functions involved. Weights indicate how severe it is if a constraint has not been met. Some constraints are very hard, whereas other constraints indicate wishes that might be partly violated. Selecting too few songs of a preferred artist may be more severe than selecting more music than that can fit in an exercise.

To find a playset that minimizes the total penalty, local search considers complete solutions or playsets. It steps from solution to solution by applying a random, small change at each iteration. The kind of changes to be allowed are: (i) adding a song, (ii) deleting a song, and (iii) replacing a song by a new one. Changing the order of songs is less relevant as constraints on sequence order are not addressed here. If the newly generated music selection is better than the original one, the new one is accepted and we enter the next iteration of local search. If the new solution is worse, the solution may be accepted with a certain probability, which decreases with the amount of deterioration, but also decreases during the course of the algorithm. In other words, the search process is 'cooling down', known as simulated annealing, to avoid becoming trapped at local minima. Simulated annealing requires a pre-defined cooling schedule for the temperature control; a standard linear cooling schedule is used.

A small modification to the above approach is not converting all constraints into penalty functions, but to handle a few easy constraints by pre-processing (i.e., by using constraint propagation principles). For instance, if the user wants all songs to be rock songs, one can easily achieve that by only using the rock songs from the music collection, and leaving all other songs out.

Exercising Stage 2

The exercising stage 2, see FIG. 2, is an on-line stage in which the pre-selected music is played back while the user is exercising. Exercises in the training program dictate what music will be played back. The system (now, a portable player) monitors and records user performance data like heart rate using a wireless connection with a heart rate sensor, and movement frequency (i.e., stride frequency for runners) and running speed using a wireless connection with a pedometer. Dependent on the required mode of motivation, music playback is adapted to the current user performance or current training goal. Besides standard linear playback, the following advanced music playback modes have been realized:

Constant tempo: music is played back at a constant tempo to motivate the exerciser to synchronize her steps with the music for enhanced endurance. Its aim is to help the exercise to evenly distribute her effort over a distance and reducing recovery costs due to brief high intensity efforts.

Pace matching: music tempo is continually adapted to the current stride frequency of the exerciser to support the running at varying stride frequencies without having to concentrate on keeping time.

Pace influencing: music tempo is sped up/slowed down to motivate the exerciser to speed up/slow down in the same manner by synchronizing her steps with the music. In this case, the goal is to arrive at a performance level as defined in the training program.

The method performed in the pace influencing mode comprises a step 7 of selecting a human perceptual signal in dependency of a pace of a person 3, a step 8 of adapting the human perceptual signal in dependency of a physical state of the person, an adaptation being limited to a certain maximum, and a step 9 of reproducing the human perceptual signal.

The different modes of playback are relevant for different ways of exercising that can vary in type of motion (e.g., running, cycling, interval, jogging), pace, intensity, and duration. The assumption is that the performance of the user is measured, while exercising. The user performance can be expressed as running pace in step frequency using a pedometer, as cycling pace in revolution frequency using a cyclometer, or as heart rate in heartbeats per minute using a cardiometer. For running, the step frequency can be taken as unit of performance. For cycling, half the cycling frequency can be taken as unit of performance. For rowing, half of the full rowing cycle can be taken as unit of performance. For heart rate, a single heartbeat can be taken as unit of performance. Different units of performance can be defined for different sports. Properties of music playback (e.g., tempo, loudness, sound position, equalization) are then adapted on the basis of the current user performance and currently selected playback mode. For instance, the tempo of the music playback can be controlled by music transformation technologies (e.g., time stretching), if required. The modes of playback are extended over songs, implying that new songs are chosen on the basis of the playback mode and the current user performance.

Obviously, the user has control on the playback; songs and exercises can be skipped or prolonged using interactive controls on the player. Also, different modes of playback can be selected. Lastly, the duration and the intensity of the current exercise are monitored for signaling the user to go to the next exercise. Song selection is based on the current user performance, current exercise goal, mode of music playback, and history of already played songs.

The different modes of music playback require different control and music selection strategies. Standard linear playback requires no further elaboration. The system is set-up with a portable music player, heart rate monitoring (typically comprising of a chest belt with a wireless transmitter, and a receiver connected to the player) and stride frequency monitor (using a pedometer connected to the player). The used chest belt transmits a pulse for every heart beat. The system uses a five-point moving average of incoming pulse intervals as the current heart rate. For stride frequency, a five-point moving average is used as well.

A) Constant Tempo: Music playback by constant tempo transforms the tempo of a given song by time stretching, if the original tempo of the song does not meet the desired tempo. In short, time stretching is the shortening or lengthening of a audio data file without pitch modifications according to a scaling factor. Obviously, this needs to happen faster than real-time for online stretching and playback; a standard time-domain technique based on synchronous overlap-and-add (SOLA) is used. The scaling factor represents the ratio between the desired tempo and the original tempo of the song. Time stretching can not be done with impunity for extreme scale factors, as music that is modified too extensively (e.g., more than 125%) sounds awkward. Therefore, the (next) song for playback is defined as the one whose original tempo comes closest to the desired tempo and which has not been played back recently. If desired, songs by one artist are not played successively.

B) Pace matching: Exercisers are motivated by music that is synchronized to their movements. Pace matching synchronizes the music to the user's stride frequency. Stride frequency, or pace, is the number of ground impacts of the user's feet in the course of one minute and is denoted in steps per minute (spm). The music tempo is denoted in beats per minute (bpm) where one musical measure in a meter of 4/4 consists of 4 beats. In order to match the music tempo to the stride frequency, the music needs to be played faster or slower by using time stretching. Typical maximal values for the scaling factors involved in time stretching are −15% to +25%. For a song with a tempo of 100 bpm, this results in a stretch range of [85, 125].

Playing music in a tempo of 75 bpm when the stride frequency is 150 spm is also considered a match, as the moment of a foot impact can still coincide with a musical beat. Note that we assume that the music tempo and the user's strides are in phase. In general, multiples (2×, 4×, 8×, . . . ) or integral divisions $$\left(\frac{1}{2}, \frac{1}{4}, \frac{1}{8}, \dots\right)$$

of stride frequency are considered matching with the music tempo.

For instance, if the tempo of the current song is 100 bpm (meaning a song stretch range of [85, 125]) and the stride frequency is 210 spm, the system would change the music playout tempo to 105 bpm. If the stride frequency is 130 spm, no valid match inside the song stretch range can be found. In this case, the music playout tempo is changed to the stretch border closest to the stride frequency by time stretching the song. Then, a new song is selected, under the condition that the current song has been played long enough (say, 30 seconds, to reduce repetitive song changing over time). The new song is required to have a stretch range that includes the current playout tempo as well as the current stride frequency, in order to allow for a transition without abrupt tempo changes.

Changing playout tempo is done in a smooth fashion. When a change in tempo is done instantly, a hick-up in the music playback is evident. On the other hand, when the change takes a long time, system response is too slow (i.e., in excess of 10 seconds) to accurately match the user's stride frequency. The parameter that specifies system response time in pace matching mode is $T_m$, which specifies the time that a maximal change in playout tempo as defined by the song's stretch range should take. A linear function is used to calculate the actual time to change from a given playout tempo to a new playout tempo. This function, denoted by $t_m$, is supplied with two points, $t_m(0)=0$ and $t_m(\Delta_{max})=T_m$, where $\Delta_{max}$ denotes maximal change in playout tempo. A linear relationship is assumed, but as a future extension, a square root relationship can be used to propagate small changes relatively faster than larger ones.

When considering the above example with an assumed $T_m=1000$ msecs, a change from 100 to 105 bpm would take $$t_m(\Delta_{100\to 105}) = \frac{|100-105|}{|85-125|} = 125 \text{ msecs}.$$

C) Pace Influencing: To motivate exercisers to reach and to keep their heart rate within a certain heart rate zone, the system uses a four-step method:

1) Match the music playout tempo with the user's stride frequency to ensure the connection between them;
2) Determine heart rate goal and, from that, stride frequency and music playout tempo subgoals;
3) Propagate the change in music playout tempo from the current playout tempo to the playout tempo desired by the determined subgoal.
4) Wait for heart rate stabilization.

These steps are repeated in a continuous loop until the exercise goal has been reached.

The assumption is that by matching music playout tempo to stride frequency in step 1, a change in playout tempo in step 3 will have a synchronization effect on the user's stride frequency. In other words, the exerciser will automatically keep her movements in time with later changes in music playout tempo. Matching playout tempo and stride frequency is done by using the pace matching mode described earlier. As soon as the stride frequency is matched, the system advances to the next step.

In the second step, the user's current heart rate is compared with the heart rate goal of the current exercise, and the difference percentage is determined. A prediction of the required stride frequency is made by applying the heart rate difference percentage directly to the current stride frequency. From sports physiology, we know that heart rate will alter linearly with exercise intensity. In other words, an increase of 10% in heart rate means a 10% increase in stride frequency. The desired stride frequency is then transformed into a desired music playout tempo; the desired playout tempo can be a multiple or integral division of the desired stride frequency.

Like in pace matching mode, when the current song can not be further stretched to accommodate the change in music playout tempo, the system changes the playout tempo to the closest value possible (i.e., either the maximal or minimum song stretch boundary). Subsequently, it selects a new song that has a stretch range that includes the reached and the desired music playout tempo.

The system keeps a history of heart rate measurements. From that, it can make a prediction how the heart rate (and hence the desired playout tempi) will progress in the next 30 seconds. This prediction provides valuable information on what song is best to choose next, if song changing is required for playback. It effectively minimizes the number of song changes needed.

A change in music playout tempo is not carried out immediately, since an abrupt change in playout tempo would cause the user not to follow the change, either because of ignorance or fatigue. Instead, the system takes into account a propagation time. Like in pace matching mode, a linear function is used to calculate the actual time to change from a given playout tempo to a new playout tempo. This function, denoted by $t_i$ is supplied with two points, $t_i(0)=0$ and $t_i(\Delta_{max})=T_i$, where $\Delta_{max}$ denotes maximal change in playout tempo.

Finally, when the change has been propagated, the system waits for the user's heart rate to stabilize before making additional changes. From experiences when testing, the user's cardiovascular system needs some time to adapt to the additional effort. Rather than specifying a fixed waiting time after each change, the system looks for a trend of decreasing differences in successive heart rates with small derivative values.

In addition, to encourage users in working out more intensively, the music can be played louder, lower frequencies can be accentuated, and/or the music can be played back as if it is in front of the listener. New songs can be selected that have a tempo that corresponds to a level of performance that is slightly higher than the current user performance. In addition, to encourage users in working out less intensively, the music can be played softer, lower frequencies can be attenuated, and/or the music can be played back as if it is behind the listener. New songs can be selected that have a tempo that corresponds to a level of performance that is slightly lower than the current user performance.

Feedback Stage 4

The feedback stage 4 is concerned with off-line performance storage and feedback. Performance data, the training program actually performed, and the list of songs actually played back is stored for user inspection and system learning purposes. The performance data can be graphically displayed for inspection, self-esteem, motivation, and for advising on adapting the current training method. The system acquires data for learning what music is best suitable for what type of exercise.

Finding Music that Fits a Training Program

The most important characteristic that determines the suitability of a song in the music database for use in a particular exercise is its tempo. Other characteristics include, for example, its percussiveness (the amount of beats in the song), its meter, its key, the musical instruments used in the recording, etc. Since the amount of storage space is often limited, a way has to be found to ensure the right music is on the portable device so that a suitable song can be found at all times, taking into account user preferences such as 'do not play the same song twice during one training program' or 'do not play songs by the same artist successively'. This can be achieved by generating a tempo probability graph per exercise and then combining these graphs to a global tempo probability graph for the entire training program.

In an embodiment of the method of the invention, the pace that matches the exercise heart rate zone is determined in order to find music that fits the training program. Unfortunately, this relationship is not a straightforward one. The heart rate resulting from running at a certain pace varies from user to user and over time due to factors such as, among others, endurance (how long is the running already going on), fatigue, fitness of the runner, the weather conditions and the time of day. However, certain average tempos may be assumed, resulting in a table like:

| HR  | gender | age      | pace  |
|-----|--------|----------|-------|
| 50% | male   | under 30 | 90.2  |
| 50% | male   | 30-40    | 88.6  |
| 60% | male   | under 30 | 110.1 |
| 70% | male   | under 30 | 116.5 |
| 70% | female | under 30 | 112.9 |
| 70% | female | 30-40    | 110.7 |
| 80% | male   | under 30 | 125.0 |

Another important aspect for determining the average tempo for an exercise is the position of the exercise within the training program. For instance, the pace needed to reach a 110 heart rate when starting exercising might be 90, while after 30 minutes a pace of 80 will be enough to reach this heart rate. Therefore, a user's fatigue curve can be assumed based on gender and age, in which the influence of time on the pace needed to reach a certain heart rate level is documented. These rough tables and fatigue curves are based on classifications of users because of gender and age groups. This information can be entered by the user easily and does not require lots of time for the system's calibration.

Having established a predicted value for the pace of each of the exercises in a training program, a Gaussian distribution can be assumed from these average paces, estimating the likelihood of a particular tempo in an exercise with a typical heart rate zone:

$$f(x) = \frac{1}{\sigma\sqrt{2\pi}} e^{-(x-\mu)^2/2\sigma^2}$$

The mean μ in this straightforward Gaussian function is the average estimated pace for an exercise, where as the standard deviation σ denotes the width of the resulting graph. The standard deviation can be determined taking in consideration the estimated tempo of the previous exercise (as it is likely that this tempo is the tempo at which the current exercise will be started) and the next exercise (for similar reasons). All of the above takes into account statistical information on the performances of user classes (age and gender groups). Also, information from the training program is used. However, during exercise, data on the user's performance is logged and this is collected in the feedback stage, after exercising. This data can be used to make the distributions more personal.

First, the average deviation can be determined for certain types of exercises and this can be used in conjunction with the statistical information already available to find a better standard deviation σ for this class of exercises. Also the mean tempo μ in the function can be determined much more precise when taking into account the user's performance. An effective way to perform this combination would be to generate a real curve from the user's performance and average out this curve with the one already created before. The same process can be applied to the user's fatigue curve. In this way, the prediction of tempo is getting more and more precise with each new exercise that is completed by the user.

Having created more or less precise distributions for each individual exercise, all these curves can be summed up to one global distribution for the entire training program. The relative weight of the exercises can be taken into account. This weight is determined by looking at the duration of the exercises with respect to the length of the entire training program. One of the problems that arises is that some exercise durations may be expressed in kilometres or target heart rate instead of time. For the distance duration exercises, the distance may be multiplied with the average running speed, taking into account the user's fatigue curve. For target heart rate, the user's fatigue curve can be taken into account as well.

When a global distribution has been established for the entire training program, this distribution can be mapped to total playing time available on a music (player) memory. Preferably, the total playing time is dependent on the amount of space on the memory and the average compression level for individual songs. Matching this graph can be made one of the constraints that songs need to satisfy in the Preparation stage 1, see FIG. 2.

User Interface

In an embodiment of the system, the system allows a user to stop, skip, pause or resume an exercise in a training program, the currently playing song in the playlist, and the mode of music playback. The music player keeps itself strictly to the training program by playing only music that was pre-selected for individual exercises and by taking into account the duration of the exercises or the time it takes to reach a pre-defined performance level. User control of the music playback is effectuated by the present invention consisting of a user interface system that provided access to interactive controls.

The system starts by playing music that has been pre-selected for the first exercise. The type of exercise is conveyed to the user, either by speech synthesis and/or a textual/display cue. Also, song information is conveyed to the user, for instance, by display and/or speech synthesis. Exercises can have a pre-defined fixed duration or can have a variable duration. In the latter case, the exercise will be prolonged until a pre-defined level of user performance has been reached or as long as a pre-defined level of user performance has to be maintained (see FIG. 1).

While doing the exercise and listening to music, a user can pause the music playback and the exercise, for instance, when full attention is required for other tasks such as crossing a road or talking to a passer-by. The music and the exercise can be resumed afterwards. Resumption may mean re-starting an exercise, if the exercise deals with reaching or maintaining a particular level of performance. The user is informed about the state of the exercise, either by display and/or speech synthesis.

If playback of a particular song is disliked, the user can skip the currently playing song. Then, a next pre-selected song will be played back. Choice of this new song may depend on the mode of playback. Information about the new song is conveyed to the user. Skipping songs can be done repetitively, until a preferred song is found. The choice of new songs is cyclic, allowing for user error recovery and full navigation through all songs that are pre-selected for an exercise.

The user is informed when an exercise can be ended. Ending of an exercise means that the pre-defined duration has expired or the user successfully reached or maintained a particular level of performance. This information can be conveyed by an auditory cue, a vibratory cue, a textual/display cue, a LED-light cue, or by changing properties of the music playback (e.g., slowing down, softer). The user then decides to move on to the next exercise by skipping the current exercise. The user may also decide to stay with the current exercise; after a short period, the device will re-start the current exercise. At all times, the user can decide to skip the current exercise, even if the exercise has not been ended yet. Moving on to the next exercise is cyclic. If one is at the last exercise in the training program, the next exercise will be the first one in the program. This cyclic nature allows for user error recovery and full navigation. Other embodiments of the system may have only some of the feature described above.

Figure 3:
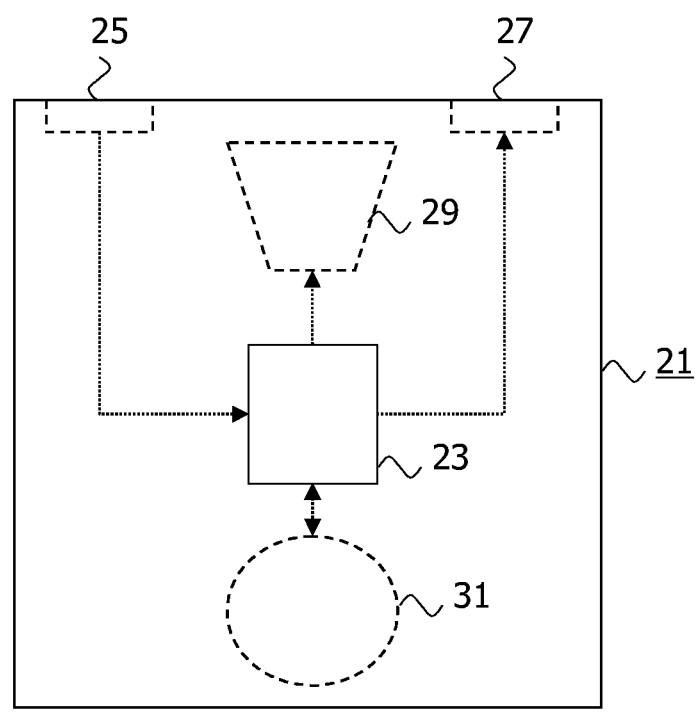
FIG. 3 is a block diagram of the electronic device of the invention.

The electronic device 21 of the invention comprises electronic circuitry 23, see FIG. 3. The electronic circuitry 23 is operative to select a human perceptual signal in dependency of a pace of a person, adapt the human perceptual signal in dependency of a physical state of the person, an adaptation being limited to a certain maximum, and reproduce the human perceptual signal. The electronic device 21 may be stationary or portable. The electronic device 21 may be, for example, a content reproduction device for reproducing the human perceptual signal while the person is performing the physical activity. The electronic device 21 may comprise an input 25, e.g. a USB port or a network connection, for receiving content items. The electronic device 21 may comprise an output 25, e.g. a USB port, a network connection, or an earphones jack, for reproducing the human perceptual signal on another device. The electronic device 21 may comprise a (fixed or removable) storage means 31, e.g. a hard disk, solid-state memory and/or an optical disc reader. The storage means 31 may store content items, for example. The electronic device 21 may comprise a reproduction means 29, e.g. a speaker, a tactile feedback generator, a display or a lamp, for reproducing the human perceptual signal. The electronic circuitry 23 may be, for example, a general-purpose or application-specific processor. Software can be used to make the electronic circuitry 23 operative to perform the method of the invention.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. 'Software' is to be understood to mean any software product stored on a computer-readable medium, such as a floppy disk, downloadable via a network, such as the Internet, or marketable in any other manner.

The invention claimed is:

1. An electronic device for reproduction of content items during performance by a user of a training program having a sequence of physical exercises, the electronic device comprising:
   a memory configured to store a plurality of content items; and
   an electronic circuitry configured to, during performance of a current exercise of the sequence of physical exercises, perform acts of:
      determining a current pace of the user;
      selecting a content item of the plurality of content items for the reproduction of the content item based on the current pace;
      determining a current heart rate of the user and a target heart rate of the user;
      adapting characteristics of the content item in response to a mismatch between the current heart rate and the target heart rate;
      reproducing the adapted content item;
      predicting a future heart rate of the user in a next plurality of seconds based on a history of heart rate measurements of the user; and
      selecting a new content item to be reproduced based on the future heart rate of the user.

2. The electronic device of claim 1, wherein the characteristics include a tempo of the content item, and wherein the adapting acts adapts the tempo up to a maximum adaptation.

3. The electronic device of claim 2, wherein the adapting acts increases the tempo of the content item when the current heart rate is below the target heart rate.

4. The electronic device of claim 2, wherein the adapting acts decreases the tempo of the content item when the current heart rate exceeds the target heart rate.

5. The electronic device of claim 1, wherein the electronic circuitry is configured to maintain the characteristics of the content item when the current heart rate meets the target heart rate.

6. The electronic device of claim 1, further comprising a user control for pausing the current exercise, and wherein the electronic circuitry maintains the characteristics of the content item while the current exercise is paused.

7. The electronic device of claim 1, further comprising a user control for skipping to a next physical exercise.

8. A method for reproduction of content items during performance by a user of a training program having a sequence of physical exercises, the method comprising acts of:
   providing a memory storing a plurality of content items;
   during performance of a current exercise of the sequence of physical exercises:
      determining a current pace of the user;
      selecting a content item of the plurality of content items for the reproduction of the content item based on the current pace;
      determining a current heart rate of the user and a target heart rate of the user;
      adapting characteristics of the content item in response to a mismatch between the current heart rate and the target heart rate;
      reproducing the adapted content item;
      predicting a future heart rate of the user in a next plurality of seconds based on a history of heart rate measurements of the user; and
      selecting a new content item to be reproduced based on the future heart rate of the user.

9. The method of claim 8, wherein the characteristics include a tempo of the content item, and wherein the adapting acts adapts the tempo up to a maximum adaptation.

10. The method of claim 9, wherein the adapting acts increases the tempo of the content item when the current heart rate is below the target heart rate.

11. The method of claim 9, wherein the adapting acts decreases the tempo of the content item when the current heart rate exceeds the target heart rate.

12. The method of claim 8, wherein the electronic circuitry is configured to maintain the characteristics of the content item when the current heart rate meets the target heart rate.

13. The method of claim 8, further comprising an act of pausing the current exercise, and wherein the electronic circuitry maintains the characteristics of the content item while the current exercise is paused.

14. The method of claim 8, further comprising an act of skipping to a next physical exercise.

15. A non-transitory computer readable storage medium including a set of instructions executable by a processor of an electronic device, the set of instructions being operable to cause the processor to perform a method for reproduction of content items during performance by a user of a training having a sequence of exercises, the method comprising acts of:
   during performance of a current exercise of the sequence of physical exercises:
      determining a current pace of the user;
      selecting, from a memory storing a plurality of content items, a content item to be reproduced based on the current pace;
      determining a current heart rate of the user and a target heart rate of the user;
      adapting characteristics of the content item in response to a mismatch between the current heart rate and the target heart rate;
      reproducing the adapted content item;
      predicting a future heart rate of the user in a next plurality of seconds based on a history of heart rate measurements of the user; and
      selecting a new content item to be reproduced based on the future heart rate of the user.

* * * * *